US010282254B1

(12) United States Patent
Chopra et al.

(10) Patent No.: US 10,282,254 B1
(45) Date of Patent: May 7, 2019

(54) OBJECT LAYOUT DISCOVERY OUTSIDE OF BACKUP WINDOWS

(71) Applicant: EMC Corporation, Hopkinton, MA (US)

(72) Inventors: Shelesh Chopra, Bangalore (IN); Asif Khan, Bangalore (IN); Satyendra Nath Sharma, Bangalore (IN); Shubhashish Mallik, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 274 days.

(21) Appl. No.: 14/672,526

(22) Filed: Mar. 30, 2015

(51) Int. Cl.
G06F 11/14 (2006.01)
H04L 29/08 (2006.01)

(52) U.S. Cl.
CPC .......... G06F 11/1412 (2013.01); H04L 67/10 (2013.01)

(58) Field of Classification Search
CPC .................................... G06F 11/1412
USPC ........................................... 707/640
See application file for complete search history.

(56) References Cited

U.S. PATENT DOCUMENTS

| | | | |
|---|---|---|---|
| 6,912,548 B1* | 6/2005 | Black | G06F 17/30067 707/783 |
| 9,292,327 B1* | 3/2016 | von Thenen | G06F 11/1451 |
| 9,535,932 B1* | 1/2017 | DeSantis | G06F 17/30289 |
| 2006/0075007 A1* | 4/2006 | Anderson | G06F 3/0608 |
| 2007/0006018 A1* | 1/2007 | Thompson | G06F 11/1466 714/6.12 |
| 2007/0266037 A1* | 11/2007 | Terry | G06F 3/0607 |
| 2008/0104144 A1* | 5/2008 | Rajan | G06F 3/0607 |
| 2010/0049929 A1* | 2/2010 | Nagarkar | G06F 9/45533 711/162 |
| 2011/0040747 A1* | 2/2011 | Brad | G06F 17/30914 707/722 |
| 2014/0036317 A1* | 2/2014 | Krig | G06F 3/0638 358/3.24 |
| 2014/0047190 A1* | 2/2014 | Dawkins | G06F 12/0813 711/136 |
| 2014/0095816 A1* | 4/2014 | Hsu | G06F 3/0655 711/162 |
| 2015/0026222 A1* | 1/2015 | Litzenberger | G06F 17/30109 707/804 |
| 2016/0154704 A1* | 6/2016 | Kuo | G06F 11/1451 707/646 |

* cited by examiner

Primary Examiner — Jensen Hu
(74) Attorney, Agent, or Firm — Dergosits & Noah LLP; Todd A. Noah

(57) ABSTRACT

Object layout discovery outside of backup windows is described. A system receives, from a backup/restore application, a request to discover an object layout for a data object by parsing the data object. The system determines whether the object layout is stored in layout storage. The system sends, to the backup/restore application, the object layout stored in the layout storage in response to a determination that the object layout is stored in the layout storage.

17 Claims, 4 Drawing Sheets

| File System 202 | Volume Name 204 | Disk ID 206 | Source LUN ID 208 | World Wide Name (WWN) ID 210 | Target LUN ID 212 | Array ID 214 |
|---|---|---|---|---|---|---|
| /volume1 | Vxvol1 | DISK_001 | 123 | 60000970 000195701632 5330303 03534 | 456 | 000195701632 |
| | | DISK_002 | 124 | 60000970 000195701632 5330303 94333 | 789 | 000195701632 |
| /volume2 | Vxvol2 | DISK_003 | 111 | 60060160140027000CA5010014171E311 | 789 | APM00121301068 |

US 10,282,254 B1

OBJECT LAYOUT DISCOVERY OUTSIDE OF BACKUP WINDOWS

BACKGROUND

If a software error corrupts a data object, or if erroneous data updates the data object, a data protection administrator may restore the data object to a previous uncorrupted state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A snapshot is a capture of a state of a data object, such as a file system or an application, at a specific moment in time. A file system may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create snapshots of data objects stored on multiple storage arrays.

Snapshot and replication operations of data objects are key strategies to meet demanding Service Level Objectives (SLO) such as Recovery Point Objectives (RPO) and Recovery Time Objectives (RTO). Snapshots have changed the way that backups are perceived and led to a paradigm shift in the domain of backups. Snapshots are a mechanism that can drastically reduce the time required for backing up a data object, which may be referred to as a backup window, which may enable achievement of aggressive Service Level Agreements (SLA) that many businesses demand.

DETAILED DESCRIPTION

When using snapshot methodologies to provide backups, one requirement that significantly increases the backup window is the discovery of an object layout for a data object by parsing the data object. Although a snapshot in itself is very quick, parsing a data object is still a legacy process that is very slow and that occurs within every backup window. For example, every time that a backup/snapshot operation is required for a file system, a legacy discovery process parses the file system to identify its volumes, then identifies the disks for the identified volumes, then identifies the logical unit numbers (LUNs) and arrays for the identified disks, and only then initiates the backup/snapshots of the file system using the identified logical unit numbers and arrays. Even if the layout of the file system is unchanged since the last backup/snapshot operation, legacy discovery processes still parse the file system. Legacy discovery processes take advantage of snapshots, but these relatively slow processes occur during every backup window, which can result in failing requirements for service level agreements, all of which leads to a lower total customer experience.

Embodiments herein provide object layout discovery outside of a backup window. A request to discover an object layout for a data object by parsing the data object is received from a backup/restore application. If the object layout was stored in layout storage when the data object was previously parsed, the stored object layout is sent to the backup/restore application. For example, a discovery engine receives, from a backup/restore application, a request to discover a file system layout for the file system /volume1 by parsing the file system /volume1. If the file system layout for the file system/volume1 was stored in a journal cache when the file system/volume1 was previously parsed, the discovery engine sends the file system layout stored in the journal log for the file system/volume1 to the backup/restore application. The discovery engine moves the parsing of a file system out of the backup window by taking advantage of the previous parsing of the file system, thereby overcoming challenges in the legacy discovery process. When discovery is decoupled from the backup window, discovery only occurs when a file system changes, which significantly reduces overall backup time. The discovery engine enables meeting more aggressive timelines of service level agreements and efficiently handles more snapshots during the same amount of time, which results in a higher total customer experience. The discovery engine overcomes a problem specifically arising with legacy discovery processes, which require the parsing of data objects within every backup window.

Figure 1:
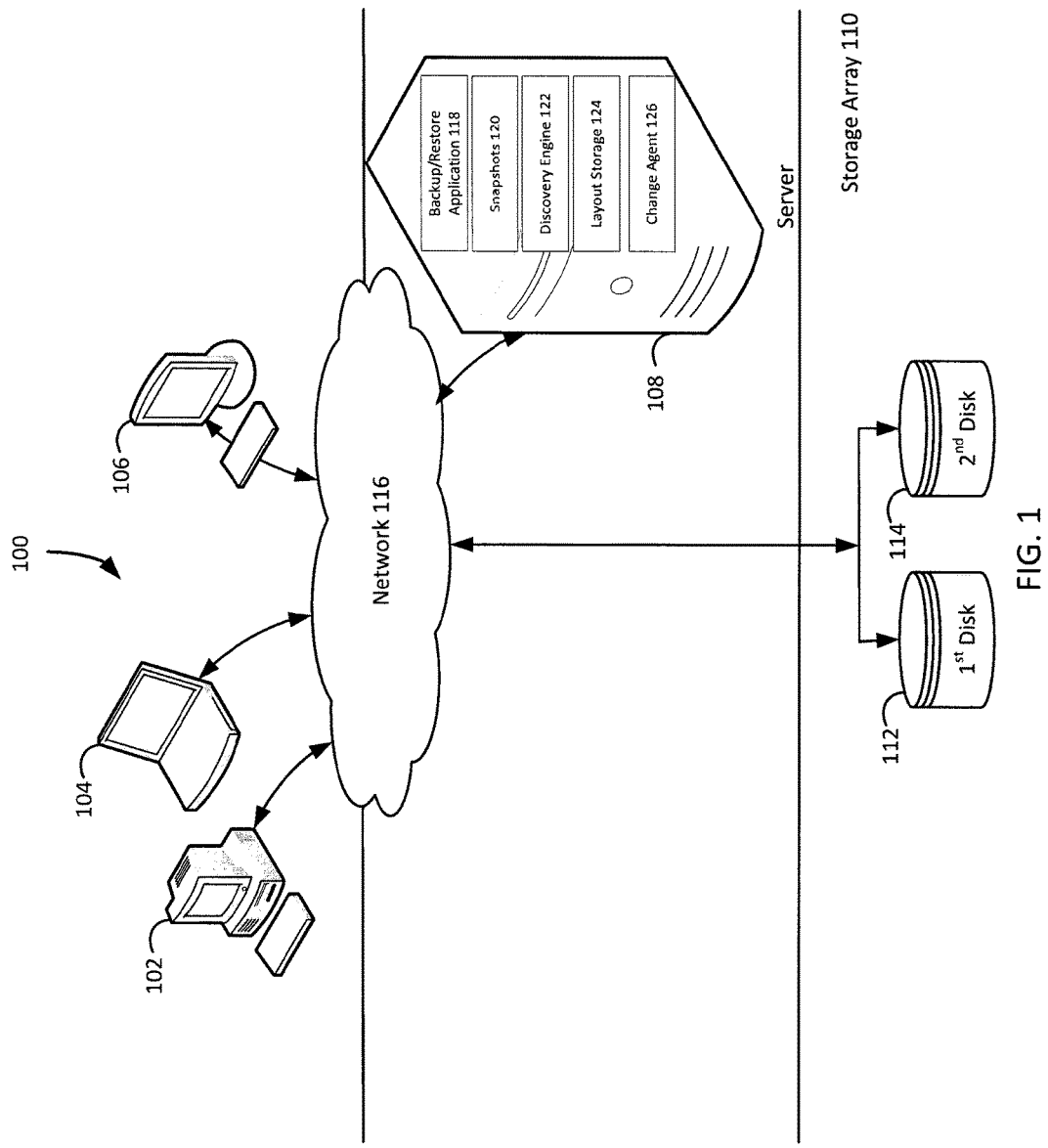
FIG. 1 illustrates a block diagram of an example system for object layout discovery outside of a backup window, under an embodiment.

FIG. 1 illustrates a block diagram of a system that implements object layout discovery outside of a backup window, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG.1 depicts the first client 102 as a personal computer 102, the second client 104 as a laptop 104, and the third client 106 as an iMac® 106, each of the clients 102-106 may be any type of computer. The storage array 110 includes a first disk 112 and a second disk 114. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 400 depicted in FIG. 4 and described below.

The server 108 includes a backup/restore application 118, snapshots 120, a discovery engine 122, layout storage 124, and a change agent 126. The backup/restore application 118 creates the snapshots 120 of data objects for the clients 102-106 and/or the server 108, and stores the snapshots 120 on the server 108, as depicted in FIG. 1, or stores the snapshots 120 remote to the server 108, which is not shown in FIG. 1. The system 100 enables the backup/restore application 118 to execute a rollback based on the snapshots 120. The layout storage 124, which may be referred to as the journal long 124 or the cache 124, may be any open source database for storing and time-stamping object layouts discovered by the discovery engine 122, and the change agent 126 may delete the object layouts stored by the layout storage 124. FIG. 1 depicts the system elements 118-126 residing completely on the server 108, but the system elements 118-126 may reside completely on the clients 102-106, completely on another server that is not depicted in FIG. 1, or in any combination of partially on the server 108, partially on the clients 102-106, and partially on the other server. Although the following paragraphs describe EMC Corporation's Avamar® backup/restore application and EMC Corporation's NetWorker® backup/restore application as examples of the backup/restore application 118, the backup/restore application 118 may be any other backup/restore application which provides the backup/restore functionalities described in the Background section.

The backup/restore application 118 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 118 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The discovery engine 122 receives, from the backup/restore application 118, a request to discover an object layout for a data object by parsing the data object. For example, the discovery engine 122 receives a request to discover the file system layout for the file system/volume1 by parsing the file system/volume1, from the backup/restore application 118. The object layout may include a volume identifier, a disk identifier, a logical unit number identifier, and/or an array identifier. Since legacy backup/restore applications map a file system's layout from the file system's volumes to the file system's disks to the file system's logical unit numbers/arrays, any change for the file system, the mapping, or the layout, or any migration would result in a new mapping, even if the change is relatively minor, such as renaming the file system.

Therefore, instead of caching an object layout for a file system based on the file system itself, the discovery engine 122 may cache an object layout associated with a worldwide name layout in addition to a file system layout. A worldwide name (WWN) is a unique identifier used for storage devices. A worldwide name may be employed in a variety of roles, such as a serial number or for addressability. An object layout based on worldwide names for storage devices is more static than object layouts based on file systems, and therefore does not change as frequently. For example, if a file system's name is changed, a worldwide name for a storage device supporting the file system is left unchanged, such that an object layout based on the worldwide name is also unchanged. Therefore, all of the required information such as disk identifiers, logical unit number identifiers, and array identifiers may be stored in the journal log 124 and enable the discovery engine 122 to avoid unnecessary parsing during subsequent backup operations.

If the object layout requested by the backup/restore application 118 is not already stored in the layout storage 124, the discovery engine 122 discovers the requested object layout by parsing the corresponding data object, stores the just-discovered object layout in the layout storage 124 for subsequent use, and sends the just-discovered object layout to the backup/restore application 118. For example, the discovery engine 122 determines that the file system layout for the file system/volume1 is not already stored in the journal log 124, discovers the file system layout for the file system/volume1 by parsing the file system/volume1, stores the just-discovered file system layout in the layout storage 124, and sends the just-discovered file system layout to the backup/restore application 118. In another example, the discovery engine 122 begins by parsing the file system/volume1 to the worldwide name identifiers 60000970 000195701632 5330303 03534 and 60000970 000195701632 5330303 94333. Then the discovery engine 122 determines that the worldwide name layouts for the identified worldwide names are not already stored in the journal log 124, discovers the worldwide name layouts for the identified worldwide names by parsing the identified worldwide names, stores the just-discovered worldwide name layouts in the layout storage 124, and sends the just-discovered worldwide name layouts to the backup/restore application 118. On the few occasions when an object layout for a data object is not already stored in the layout storage 124, the discovery process requires substantially the same amount of time and computing resources as required by legacy discovery processes.

However, on the many occasions when an object layout for a data object is already stored in the layout storage 124, the discovery process requires significantly less time and computing resources than required by legacy discovery processes. If the object layout requested by the backup/restore application 118 is already stored in the layout storage 124, the discovery engine 122 sends the previously-discovered object layout which is already stored in layout storage 124 to the backup/restore application 118. For example, the discovery engine 122 determines that the file system layout for the file system/volume1 is already stored in the journal log 124, and sends the previously-discovered file system layout already stored in the journal log 124 to the backup/restore application 118. In another example, the discovery engine 122 begins by parsing the file system/volume1 to the worldwide name identifiers 60000970 000195701632 5330303 03534 and 60000970 000195701632 5330303 94333. Then the discovery engine 122 determines that the worldwide name layouts for the identified worldwide names are already stored in the journal log 124, and sends the previously-discovered worldwide name layouts already stored in the journal log 124 to the backup/restore application 118. If the discovery engine 122 has already discovered the object layout for a storage device, the discovery engine 122 gets the previously discovered object layout from the layout storage 124, thereby decoupling the discovery process from the backup window, in contrast to the legacy discovery processes.

If only part of an object layout for a data object is not stored in the layout storage 124 the discovery engine 122 may discover only the missing part of the object layout by parsing part of the data object, and store only the missing part of the object layout in the layout storage 124. For example, the discovery engine 122 determines that the file system layout for disk 1 of the file system/volume1 is already stored in the journal log 124 and determines that the file system layout for disk 2 of the file system/volume1 is not already stored in the journal log 124. Therefore, the discovery engine 122 discovers the file system layout for disk 2 of the file system/volume1 by parsing the file system/volume1, stores the just-discovered file system layout for disk 2 of the file system/volume1 in the layout storage 124, and sends the file system layouts for disk 1 and disk 2 of the file system/volume1 to the backup/restore application 118. In another example, the discovery engine 122 begins by parsing the file system/volume1 to the worldwide name identifiers 60000970 000195701632 5330303 03534 and 60000970 000195701632 5330303 94333. Then the discovery engine 122 determines that the worldwide name layout for the first identified worldwide name is already stored in the journal log 124 and determines that the worldwide name layout for the second identified worldwide name is not already stored in the journal log 124. Therefore, the discovery engine 122 discovers the worldwide name layout for the second worldwide name by parsing the second worldwide name, stores the just-discovered worldwide name layout for the second worldwide name in the layout storage 124, and sends the worldwide name layouts for the both worldwide names to the backup/restore application 118.

The change agent 126 can monitor specific changes to a data object and delete a corresponding object layout from the layout storage 124 based on the specific changes to the data object. For example, the change agent 126 deletes the file system layout stored in the journal log 124 for the file system/volume1 in response to detecting a reduction in the file system/volume1 via the removal of disk 2. In another example, the change agent 126 deletes the worldwide name layout stored in the journal log 124 for the file system/volume1 in response to detecting a reduction in the file system/volume1 via the removal of disk 2. Other changes that the change agent monitors and which can trigger the deletion of a corresponding object layout from the layout storage 124 may include expanding a volume by adding a disk, rebooting a host, re-initializing a storage subsystem, re-hosting a host bus adapter, reconfiguring a storage area network, failing over a cluster, migrating, manual deletion by a user, and resetting by a small computer system interface (SCSI). The server 106 may track each action of the change agent 126 for further auditing/references.

As an alternative to the operation of the change agent 126, a user of the system 100 may specify when to re-discover the object layout for a data object, which is then stored in the layout storage 124. For example, the user may initiate re-discovery based on a weekly schedule or based on re-discovery by user demand. The discovery process based on user specification remains outside the backup window.

Figure 2:
FIG. 2 is a screen shot illustrating simplified example data for object layout discovery outside of a backup window, under an embodiment.

FIG. 2 illustrates simplified example data for object layout discovery outside of a backup window, under an embodiment. The data 200 includes a file system 202 column, a volume name 204 column, a disk 206 column, a source LUN ID 208 column, a worldwide name (WWN) ID 210 column, a target LUN ID 212 column, and an array 214 column. Although not depicted in FIG. 2, the data 200 may include any number and types of additional rows and additional columns. The first data row of the data 200 indicates that the file system/volume1 corresponds to two worldwide name identifiers, 60000970 000195701632 5330303 03534 and 60000970 000195701632 5330303 94333, which correspond to disk 1 and disk 2, respectively, which corresponds to source logical unit number identifiers 123 and 124, respectively, which corresponds to target logical unit number identifiers 456 and 789, respectively, and which corresponds to the same array identifier 000195701632 for both word wide name identifiers. In this example, the worldwide name identifier 60000970 000195701632 5330303 03534 includes the array identifier 000195701632. Therefore, the discovery engine 122 can extract an array identifier from a worldwide name identifier, and store the extracted array identifier in the layout storage 124, such as in the array ID 214 column for/volume1. The discovery engine 122 may also use a worldwide name identifier to identify a corresponding disk identifier and/or a source corresponding logical unit number identifier by searching a configuration file. The backup/restore application 118 may identify the corresponding target corresponding logical unit number identifiers.

Figure 3:
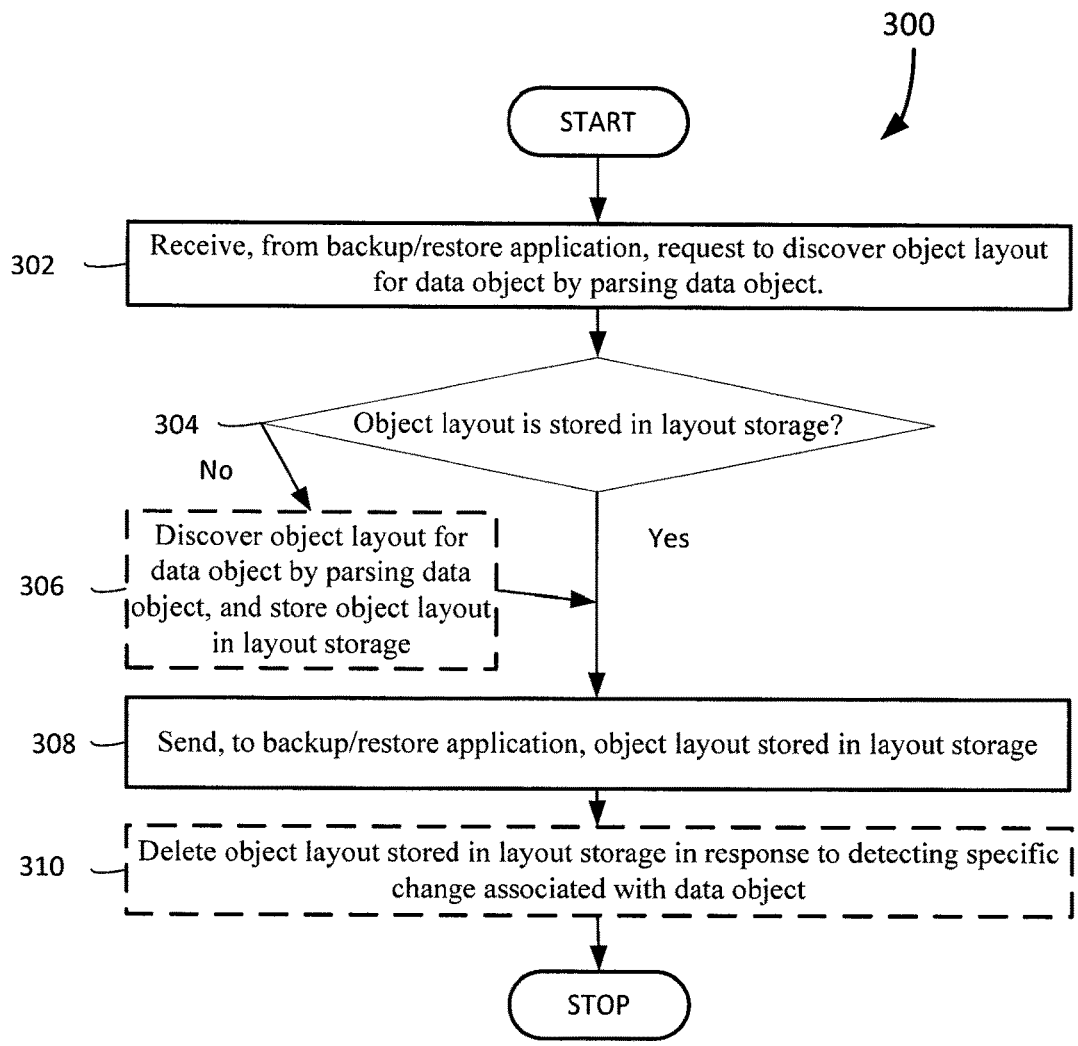
FIG. 3 is a flowchart that illustrates a method of object layout discovery outside of backup a window, under an embodiment.

FIG. 3 is a flowchart that illustrates an embodiment of a method for object layout discovery outside of a backup window. The method operations set forth in flowchart 300 of FIG. 3 are illustrated as flowchart blocks for certain steps involved in and/or between the clients 102-106 and/or the server 108 of FIG. 1.

A request to discover an object layout for a data object by parsing the data object is received from a backup/restore application, block 302. For example, the discovery engine 122 receives a request to discover the file system layout for the file system/volume1 by parsing the file system/volume1, from the backup/restore application 118.

A determination is made whether an object layout for a data object is stored in layout storage, block 304. For example, the discovery engine 122 determines whether the file system layout for the file system/volume1is stored in the journal log 124. If an object layout for a data object is not stored in layout storage, the flowchart 300 continues to block 306. If an object layout for a data object is stored in layout storage, the flowchart 300 proceeds to block 308.

An object layout is optionally discovered for a data object by parsing the data object and storing the object layout in layout storage in response to a determination that the object layout is not stored in the layout storage, block 306. For example, the discovery engine 122 discovers the file system layout for the file system/volume1 by parsing the file system/volume1 and storing the file system layout in the layout storage 124 if the file system layout for the file system/volume1 by is not stored in the journal log 124.

An object layout stored in layout storage is sent to a backup/restore application if the object layout is stored in the layout storage, block 308. For example, the discovery engine 122 sends the file system layout stored in the journal log 124 for the file system/volume1 to the backup/restore application 118 if the file system layout for the file system/volume1 is stored in the journal log 124.

An object layout stored in layout storage is optionally deleted in response to detecting a specific change associated with a corresponding data object, block 310. For example, the change agent 126 deletes the file system layout stored in the journal log 124 for the file system/volume1 in response to detecting a reduction in the file system/volume1 via the removal of disk 2.

Although FIG. 3 depicts the blocks 302-310 occurring in a specific order, the blocks 302-310 may occur in another order. In other implementations, each of the blocks 302-310 may also be executed in combination with other blocks and/or some blocks may be divided into a different set of blocks.

Figure 4:
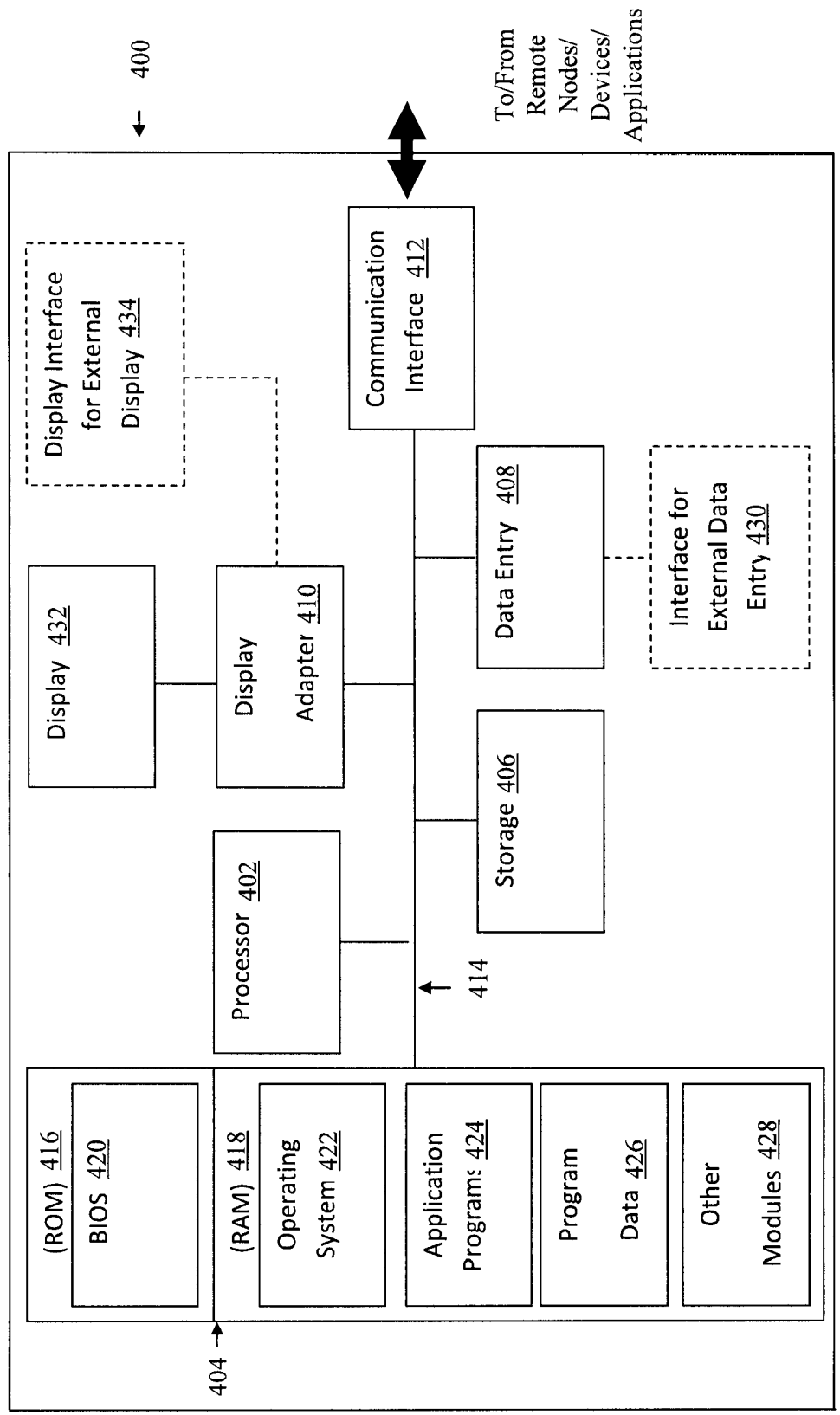
FIG. 4 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for object layout discovery outside of backup windows, the system comprising:
 a processor-based application, which when executed on a computer, will cause the processor to:
  receive, from a backup/restore application, a request to discover, by parsing a data object, an object layout for the data object, the object layout being associated with a worldwide name layout and a file system layout;
  determine whether the object layout is stored in a layout storage;
  send, to the backup/restore application, the object layout stored in the layout storage in response to a determination that the object layout is stored in the layout storage, the object layout stored in the layout storage having been discovered by a previous parsing of the data object; and parse the data object to discover the requested object layout in response to a determination that the object layout is not stored in the layout storage.

2. The system of claim 1, wherein the object layout comprises at least one of a volume identifier, a disk identifier, a logical unit number identifier, and an array identifier.

3. The system of claim 1, wherein the object layout is stored in the layout storage based on a user-specified request to discover the object layout for the data object by parsing the data object.

4. The system of claim 1, wherein sending the object layout stored in the layout storage comprises discovering only a part of the object layout for the data object by parsing part of the data object in response to a determination that only the part of the object layout is not stored in the layout storage, and storing only the part of object layout in the layout storage.

5. The system of claim 1, wherein the processor-based application further causes the processor to store the parsed object layout in the layout storage and to send the parsed object layout to the backup/restore application in response to the determination that the object layout is not stored in the layout storage.

6. The system of claim 1, wherein the processor-based application further causes the processor to delete the object layout stored in the layout storage in response to detecting a specific change associated with the data object.

7. A computer-implemented method for object layout discovery outside of backup windows, the method comprising:
   receiving, from a backup/restore application, a request to discover by parsing a data object, an object layout for the data object, the object layout being associated with a worldwide name layout and a file system layout;
   determining whether the object layout is stored in a layout storage;
   sending, to the backup/restore application, the object layout stored in the layout storage in response to a determination that the object layout is stored in the layout storage, the object layout stored in the layout storage having been discovered by a previous parsing of the data object; and
   parsing the data object to discover the requested object layout in response to a determination that the object layout is not stored in the layout storage.

8. The method of claim 7, wherein the object layout comprises at least one of a volume identifier, a disk identifier, a logical unit number identifier, and an array identifier.

9. The method of claim 7, wherein the object layout is stored in the layout storage based on a user-specified request to discover the object layout for the data object by parsing the data object.

10. The method of claim 7, wherein sending the object layout stored in the layout storage comprises discovering only a part of the object layout for the data object by parsing part of the data object in response to a determination that only the part of the object layout is not stored in the layout storage, and storing only the part of object layout in the layout storage.

11. The method of claim 7, wherein the method further comprises storing the parsed object layout in the layout storage and sending the parsed object layout to the backup/restore application in response to the determination that the object layout is not stored in the layout storage.

12. The method of claim 7, wherein the method further comprises deleting the object layout stored in the layout storage in response to detecting a specific change associated with the data object.

13. A computer program product, comprising a non-transitory computer-readable medium having a computer-readable program code embodied therein to be executed by one or more processors, the program code including instructions to:
   receive, from a backup/restore application, a request to discover by parsing the data object, an object layout for the data object, the object layout being associated with a worldwide name layout and a file system layout;
   determine whether the object layout is stored in a layout storage;
   send, to the backup/restore application, the object layout stored in the layout storage in response to a determination that the object layout is stored in the layout storage, the object layout stored in the layout storage having been discovered by a previous parsing of the data object; and
   parse the data object to discover the requested object layout in response to a determination that the object layout is not stored in the layout storage.

14. The computer program product of claim 13, wherein the object layout comprises at least one of a volume identifier, a disk identifier, a logical unit number identifier, and an array identifier.

15. The computer program product of claim 13, wherein the object layout is stored in the layout storage based on a user-specified request to discover the object layout for the data object by parsing the data object.

16. The computer program product of claim 13, wherein sending the object layout stored in the layout storage comprises discovering only a part of the object layout for the data object by parsing part of the data object in response to a determination that only the part of the object layout is not stored in the layout storage, and storing only the part of object layout in the layout storage.

17. The computer program product of claim 13, wherein the program code further includes instructions to store the parsed object layout in the layout storage and to send the parsed object layout to the backup/restore application in response to the determination that the object layout is not stored in the layout storage, and to delete the object layout stored in the layout storage in response to detecting a specific change associated with the data object.

* * * * *